Patented Sept. 26, 1922.

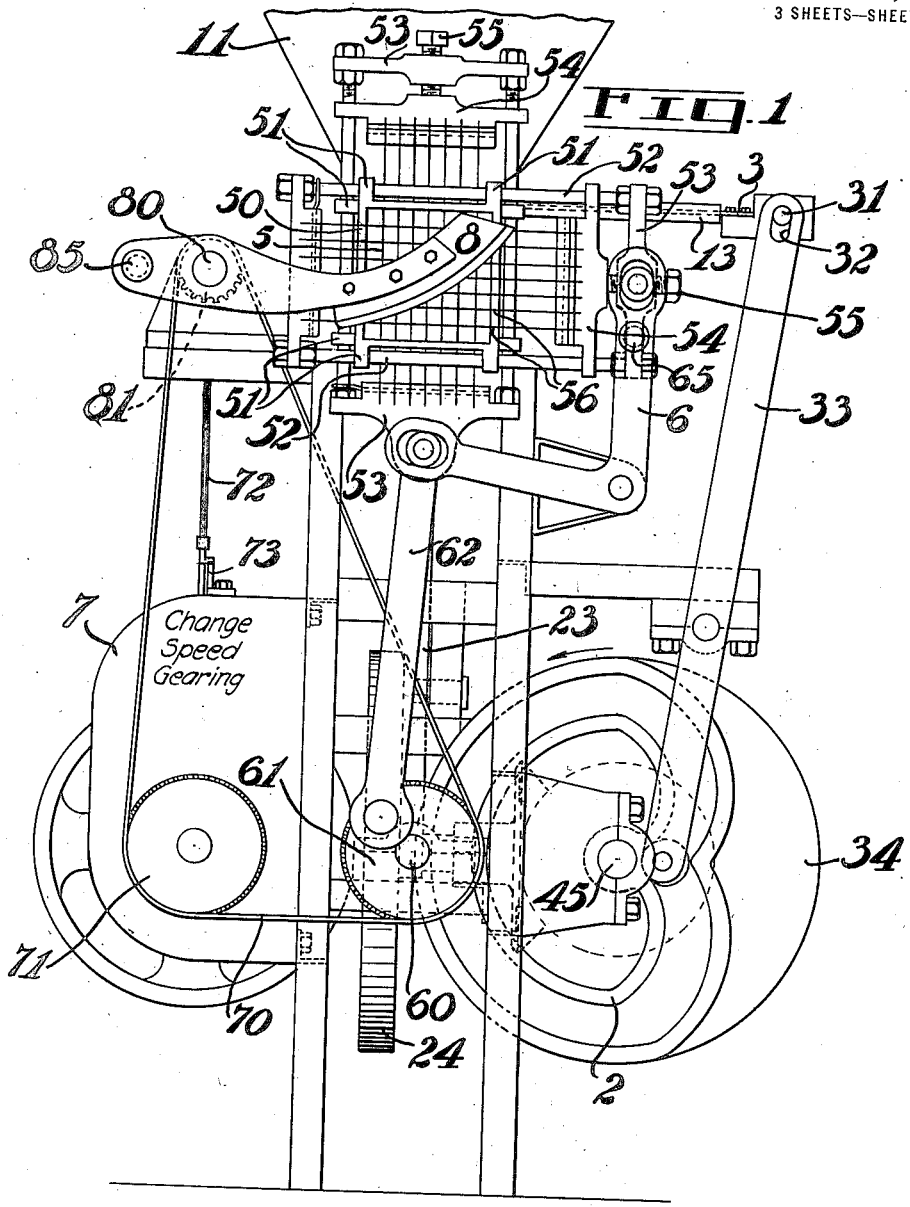

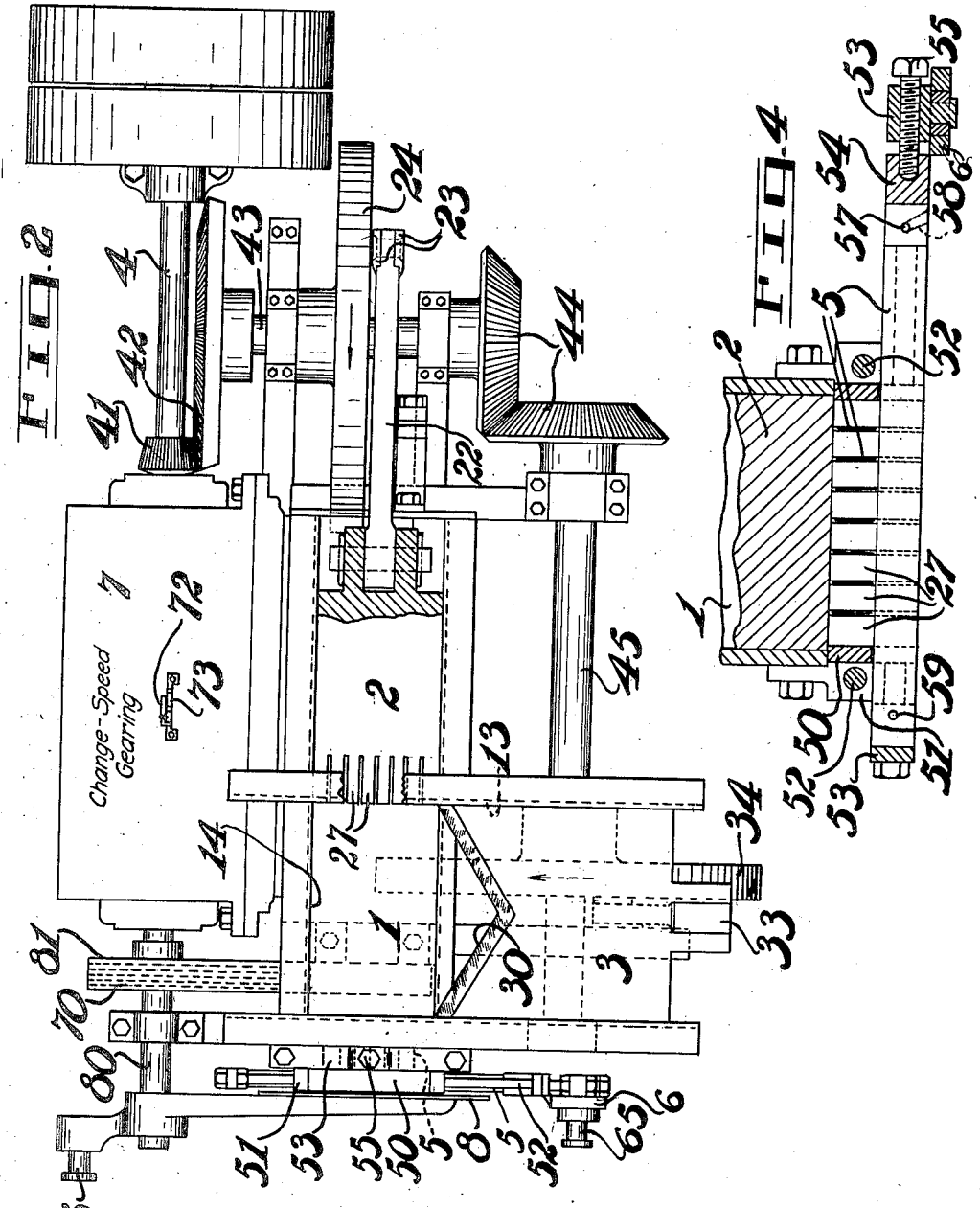

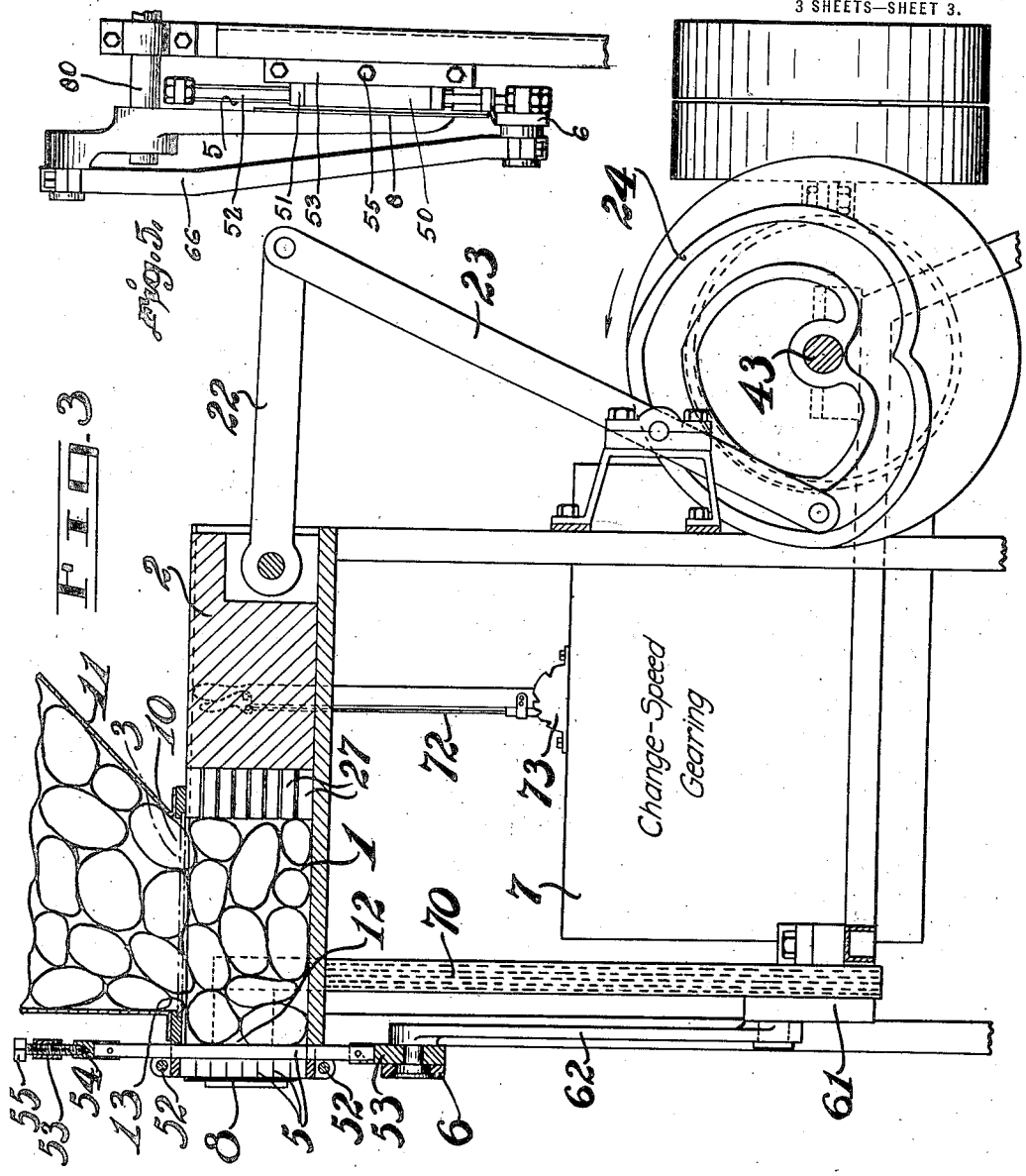

1,430,049

UNITED STATES PATENT OFFICE.

LEE ROY APPLEGATE, OF SEATTLE, WASHINGTON.

VEGETABLE-CUBING MACHINE.

Application filed June 7, 1921. Serial No. 475,754.

*To all whom it may concern:*

Be it known that I, LEE ROY APPLEGATE, a citizen of the United States of America, and resident of the city of Seattle, in the county of King and State of Washington, have invented certain new and useful Improvements in Vegetable-Cubing Machines, of which the following is a specification.

My invention relates to a machine for slicing, stripping, or cubing vegetables, meat, or like substances.

One of the objects of my invention is to provide means for slicing, stripping, or cubing vegetables whereby the size of the slices, strips, or cubes may be readily varied.

Another object of my invention is to provide means whereby vegetables may be sliced, stripped, or cubed regularly, automatically, and continuously, without attention by an operator other than keeping its feed hopper filled.

A further object of my invention is to provide a machine which at will may be arranged to slice, strip, or cube vegetables.

A further object is to provide a simple and easily controlled machine for the purposes outlined above.

Other objects may be ascertained by a study of the following description and the appended claims.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 1 is an elevation of my machine operating to cube vegetables.

Figure 2 is a plan view thereof, parts being broken away.

Figure 3 is a section through my machine, taken on a longitudinal vertical plane.

Figure 4 is a section through a portion of my device at the vegetable cutting point.

Figure 5 is a plan view of a detail showing a slightly modified form.

My machine is designed to take the place of hand cubing machines in which a series of crossed knives are fixed in a frame, which then is passed by hand through vegetables lying upon a table to cut them into small particles or cubes. In its general features my invention comprises a feed box wherein the vegetables are received from a hopper, a cut-off knife to separate the vegetables in the feed box from those in the hopper, a series of knives which may be arranged so that they will cut the vegetables into strips and then into cubes, a plunger movable in the feed box for advancing the vegetables therein through the stripping and cubing knives, and suitable control means for driving the various parts mentioned, these including preferably a change-speed gearing to change the speed of the cubing knife relative to other parts.

In connection with the present invention, in referring to strips, slices, cubes, and the like, it is not to be understood that these particles need be regular, rectilineal, or even defined by regular planes. It is within the scope of my invention to form slices which are cut by wavy or irregular planes, to form strips which are triangular, square, or of other polygonal cross-section, and to form cubes which have more or less than six sides or which are irregularly-shaped particles. The term cubes is intended only to distinguish the small particles which may be cut by a knife moving transversely of strips or slices such as are described above.

The feed box 1 has above the receiving opening 10 in its top, a hopper 11 which is secured thereupon and which communicates directly with the feed box. The feed box has a delivery opening 12 at one side. A plunger 2 is reciprocable within the feed box 1 and serves to advance vegetables therein towards the delivery opening 12. A cut-off knife 3 is reciprocable in guides 13 positioned at the sides of the receiving opening 10 to divide vegetables partly in and partly out of the feed box 1, and acts as a partition to divide the feed box from the hopper 11 at proper intervals. It also completes a cylinder within which the plunger fits snugly. Its cutting edge 30 may be angularly positioned relative to the guides 13 and the opposite edge 14 of the feed box may be sharpened to cooperate with the edge 30 of the cut-off knife.

As shown herein, the plunger 2 and cut-off knife 3 are driven from a main shaft 4 through the bevel gears 41 and 42 which rotate the shaft 43, bevel gears 44 rotating the shaft 45 and suitable cams positioned upon the shafts 43 and 45. A cam 24 positioned on the shaft 43 is connected to the plunger 2 by means of a lever 23 and connecting rod 22. A cam 34 on the shaft 45 is connected to the cut-off knife 3 by means of the lever 33 having a slot 32 therein engaging with a pin 31 carried upon the knife 3.

These cams 24 and 34 are so arranged that in the position shown in Figures 1 to 3 of the drawings, when rotation occurs in the direction of the arrows, the cut-off knife 3 will first be advanced across the receiving opening 10 of the feed box to separate the vegetables therein from those in the hopper 11. This will occur during a quarter revolution of the cams 24 and 34, and during this time the plunger 2 will remain stationary and retracted. During the next half revolution of the cams, the plunger 2 is advanced to push the vegetables in the feed box through its delivery opening 12 to be acted upon by knives to be later described. During this half revolution the knife 3 remains stationary and projected, and acts as a partition between the feed box and hopper, to define the cylinder in which the plunger reciprocates. During the next quarter revolution both the knife 3 and the plunger 2 are retracted until they again reach the position shown in the drawings, whereupon a new supply of vegetables is admitted to the feed box 1 from the hopper 11.

Across the delivery opening 12 of the feed box I position a frame 50, having an opening therethrough corresponding to the delivery opening. Guides 51 are provided therein for the reception of rods 52 forming parts of stripping knife frames. The rods 52 are secured in ends 53 of the stripping knife frames, from which the knife holders 54 at one end are supported by means of a tensioning screw 55. At the opposite end of the stripping knife frames the knives 5 are received directly in the end pieces 53.

These knives 5 are suitably secured in the end pieces 53 or knife holders 54, and are reciprocable in slots 56 in the side edges of the frame 50, parallel to the guides 51. The slots 56 for one set of stripping knives 5 may be arranged at one side of the frame 50 and those for the set of knives 5 which are angularly disposed relative to the first set may be upon the opposite edge of the frame 50. The knives 5 are removably secured in place, though the manner of their securement is not important. I have shown them as provided at one end with a pin 57 which is reciprocable in an inclined slot 58 of the knife holder 54. At its other end a pin 59 passes through the entire series of knives 5 and is received in the end piece 53.

The two sets of stripping knives 5 may be reciprocated by connecting the arms of a bell crank lever 6 each to its respective end piece 53. By oscillating the bell crank lever 6 the knives 5 are caused to reciprocate in the slots 56, being guided by the rods 52 reciprocable in the guides 51. A counter shaft 60, driven by a chain 70 running over a sprocket wheel 61 upon the counter shaft 60, and the sprocket wheel being connected to the bell crank lever 6 through a connecting rod 62, serves to oscillate the bell crank lever.

A cubing knife 8 is provided, which is movable transversely across the line of movement of the vegetables issuing from the delivery opening 12. This might be positioned inward of the stripping knives 5, but preferably I position it outside thereof, to cube the vegetables after they have been stripped. The knife might also be movable in a straight line but I prefer that it be secured upon the rotatable counter shaft 80. This counter shaft has thereon a sprocket wheel 81, which preferably is of smaller diameter than the sprocket wheel 61 and the drive sprocket 71. The single chain 70 may be arranged to drive both the sprockets 61 and 81 and, with the proportions as shown, the cubing knife 8 will be rotated three times for each complete oscillation of the knives 5.

It is highly desirable that the rate of speed of the cubing knife 8 be variable relative to the rate of advance of the plunger 2, as this determines the length of the cubes to be cut. I provide, therefore, change-speed gearing which is shown herein as enclosed in a gear box 7 and controlled by the lever 72 and quadrant 73. By varying the relative speed of the knife 8, the size of the cubes may be varied, for if the knife 8 rotates more rapidly, more cuts will be made across the vegetables during a given advance of the plunger than if the knife 8 were rotated less rapidly.

It will now be apparent that vegetables placed in the hopper 11 will fall into the feed box 1 when the cut-off knife 3 is retracted therefrom. The advance of the knife 3 will separate the vegetables in the feed box from those in the hopper above, dividing such as are only partly in the feed box. The subsequent advance of the plunger 2 will push these vegetables through the knives 5, which reciprocate, and by their reciprocation produce a slicing cut upon the vegetables. As the vegetables continue to advance the cubing knife 8 comes into operation and cuts them into small particles or cubes. The size of the cubes may be varied as described above by varying the relative speed of the cubing knife 8. Their size may also be varied by taking out or adding stripping knives 5. If all of the knives 5 of one set are left out, slices of vegetables will be produced. The cubing knife 8 may be put out of action by retaining the control handle 72 in neutral position, or otherwise, and the vegetables will then issue from the delivery opening 12 as long strips such as are used in making French fried potatoes.

If it is desired to speed up the stripping knives 5, as when cutting meat, this may be done by disconnecting the connecting rod 62 which oscillates the bell crank lever 6, and by connecting the pin 65 carried by the lever 6 and the pin 85 carried by the rotating cubing knife 8 by a suitable link 66 as shown in Figure 5. The lever 6 will then be oscillated directly from the counter shaft 80, which rotates more rapidly than the counter shaft 60.

I desire that the plunger 2 be arranged so that its outer end may project through the delivery opening 12 to the outer edge of the outermost knife 5 to the end that all of the vegetables may be pushed through the knives 5. For that purpose I split its end into cubical projections 27 separated by grooves in which the knives may be received. The grooves between the blocks 27 should be spaced, each from the next adjacent groove, by the smallest amount by which it is contemplated to separate the knives 5, and these sets of grooves are relatively positioned at the angle at which the sets of knives 5 will be placed.

What I claim as my invention is:

1. In a machine of the character described, in combination with a feed box and a communicating hopper there above, means for moving vegetables longitudinally through the feed box, and a cut-off knife movable transversely of the feed box to separate the feed box and hopper.

2. In a machine of the character described, in combination, a feed box having a delivery opening at one end and a receiving opening in its top, a hopper positioned above and connected with the feed box to deliver vegetables thereinto, means for moving the vegetables longitudinally therethrough and through the delivery opening, means for cutting up vegetables passed through said delivery opening, and a cut-off knife movable transversely of the feed box across the receiving opening to close off the hopper from the feed box.

3. In a machine of the character described, in combination with a feed box having a delivery opening at one end and a communicating hopper thereabove, a plunger for moving vegetables longitudinally through the feed box, means for cutting vegetables passed through said delivery opening, and a cut-off knife movable transversely of the feed box to completely separate the feed box and hopper prior to beginning the delivery movement of said plunger.

4. In a machine of the character described, in combination, a feed box having a delivery opening at one end and a receiving opening at its top, a hopper positioned above and connected with the feed box to deliver vegetables thereinto, means for cutting up vegetables passed through said delivery opening, a cut-off knife movable across the receiving opening to close off the hopper from the feed box, a plunger reciprocable within the feed box to deliver vegetables therefrom, and separate timing means for completing the closing of the cut-off knife prior to beginning the advance of the plunger.

5. In a machine of the character described, in combination, a feed box having a delivery opening at one side and a receiving opening in its top, a hopper positioned above and connected with the feed box to deliver vegetables thereinto, means for cutting up vegetables passed through said delivery opening, a cut-off knife movable across the receiving opening to close off the hopper from the feed box, a plunger reciprocable within the feed box to deliver vegetables therefrom, said cut-off knife being first movable to completely divide the feed box and hopper, and the plunger being then movable to advance vegetables towards said delivery opening.

6. In a machine of the the character described, in combination, a feed box having a delivery opening at one side and a receiving opening in its top, a hopper positioned above and connected with the feed box to deliver vegetables thereinto, means for cutting up vegetables passed through said delivery opening, a cut-off knife movable across said receiving opening to close off the hopper from the feed box, a plunger reciprocable within the feed box to advance vegetables therethrough, and separate cams for moving said plunger and the cut-off knife, respectively.

7. In a machine of the character described, in combination, a feed box having a delivery opening at one side and a receiving opening in its top, a hopper positioned above and connected with the feed box to deliver vegetables thereinto, two sets of relatively angularly-disposed stripping knives positioned across said delivery opening, a cut-off knife movable across said receiving opening to close off the hopper from the feed box, a plunger reciprocable within the feed box to advance vegetables therethrough, cams for moving said plunger and the cut-off knife, means for reciprocating said stripping knives relatively rapidily, and means for varying the speed of the stripping knives relative to the plunger.

8. In a vegetable cubing machine, in combination, a feed box having a delivery opening at one side and a receiving opening in its top, a hopper positioned above and connected with the feed box to deliver vegetables thereinto, two sets of relatively angularly-disposed stripping knives positioned across said delivery opening, a cut-off knife movable across said receiving opening to close off the hopper from the feed box, a cubing knife rotatable across the path of the vegetables outwardly of said delivery opening, a plunger reciprocable within the feed box to advance vegetables therethrough, a main drive shaft, cams rotatable from the main shaft to move said plunger and cut-off knife, a counter shaft carrying said cubing knife, a second counter shaft and operative connections therefrom to said stripping knives to reciprocate them, operative connection between said counter shafts and the main drive shaft, and change-speed gearing interposed between the main shaft and the countershafts.

Signed at Seattle, King County, Washington, this 2nd day of June, 1921.

LEE ROY APPLEGATE.